United States Patent Office 3,330,689
Patented July 11, 1967

3,330,689
LATEX COATED FIBROUS MATERIAL AND
METHOD OF MAKING SAME
Pritchard P. Ells and William J. Schroder, Spartanburg, S.C., assignors to Deering Milliken Research Corporation, Spartanburg, S.C., a corporation of Delaware
No Drawing. Filed June 20, 1963, Ser. No. 289,431
8 Claims. (Cl. 117—76)

This invention relates to an oxidation resistant bonding latex and more specifically to an oxidation resistant bonding latex suitable for treatment of natural and synthetic fibers.

In order to increase the adhesion or bonding between rubber and various materials and especially fibrous materials, whether in the form of cord, yarn, fabric or filaments, it is necessary to treat the fibrous material with a bonding agent. The need for a bonding agent is especially great where the fibrous material to be united with rubber is a fibrous material made from a polymeric material having limited numbers of reactive groups in the polymeric chain. Synthetic fibrous materials having limited numbers of reactive groups in their polymeric chain are fibrous materials such as for instance polyesters of the polyethylene terephthalate type.

The term "bonding latex" as used herein is meant to include colloidal emulsions of diene rubber and more specifically the rubbery polymers of conjugated dienes such as, for instance, natural rubber, reclaimed rubber, butadiene, chloroprene, isoprene, dimethyl butadiene and co-polymers and terpolymers thereof. The preferred bonding latex for purposes of this invention is the bonding latex containing a butadiene-vinyl pyridine copolymer and most preferably a modified butadiene-styrene-vinyl pyridine terpolymer. The modifying agent for the butadiene-styrene-vinyl pyridine latex may be a modifying agent such as for instance, an isocyanate modifying agent, an epoxy modifying agent, a resorcinol-formaldehyde modifying agent and the like. The aforementioned bonding latices function satisfactorily if the bonding latex treated article is formulated into a rubber laminated product soon after the bonding latex treatment. If, however, the bonding latex treated article is stored for any substantial period of time prior to being laminated with rubber in the formation of a finished product, the bonding latex is found to become oxidized presumably by oxidation reactions occurring at the double bonds, and the adhesive effect of the bonding latex between the rubber and the latex coated polymeric material is substantially reduced. While the degradation of the latex bonding agent is known to be due to the presence of oxygen, ozone and ultraviolet light, the incorporation of commercial antioxidants, antiozonants and ultra-violet light absorbers has not proved beneficial in that the latex bonding agents are commonly cured to the polymeric substrate at temperatures in the range of from about 300° F. to about 450° F., these temperatures apparently destroying the effectiveness of those components which have been previously added to prevent oxidation.

It is therefore an object of this invention to provide a diene rubber latex bonding agent wherein the oxidative breakdown of the latex bonding agent is substantially reduced.

It is another object of this invention to provide a process for the preparation of a diene rubber latex bonding agent coated fibrous material wherein the latex bonding agent of the coated article is not subjected to substantial oxidative breakdown.

It is still another object of this invention to provide fibrous material coated with a vinyl pyridine containing latex bonding agent which may be stored for substantial periods of time without the bonding agent being destroyed by oxidative breakdown.

In accordance with this invention it has now been discovered that a diene rubber bonding latex which is not subjected to oxidative breakdown may be provided by the incorporation of a paraffin wax into the diene rubber latex. The term "paraffin wax" as used herein is meant to include any of the naturally occurring hydrocarbon waxes as well as the synthesized hydrocarbon waxes in any of the amorphous forms. The paraffin waxes contemplated for use in this invention are waxes melting in the range of from 90° F. to 450° F. and preferably from about 100° F. to 350° F. and still more preferably from about 125° F. to about 250° F. The object of reducing the oxidation breakdown of the diene rubber latex may be accomplished by incorporating the paraffin wax into the latex prior to coating a substrate with a diene rubber latex, or a material previously coated with a diene rubber latex may be made oxidation resistant by superimposing a paraffin coating on the latex coating. The final paraffin coating may be accomplished by any of the means well known in the art, such as for instance, dipping the latex coated article into an aqueous emulsion or an organic solvent bath of paraffin wax or pressing the latex coated article while in a heated condition against paraffin blocks.

The amount of paraffin wax which should be present in the latex coated articles of this invention is that amount which will provide a continuous protective coating on the latex. If the paraffin is applied with the aqueous diene rubber latex mix as an aqueous emulsion, at least about 0.1% and preferably at least about 0.3% and most preferably at least about 0.75% paraffin wax solids, calculated on the total weight of the latex mix, should be used. While substantially larger amounts may not be desirable from the standpoint of slight reductions in initial adhesion values, no adverse effects will result from increasing the quantity of paraffin wax present in the latex mix, up to about 4%. The preferred range of paraffin wax in the latex mix is from about 0.75% to about 3.0%.

The oxidation resistant bonding latex of this invention may be formulated by the addition of an aqueous dispersion of a paraffin wax to an aqueous dispersion of a diene rubber latex. The preferred aqueous dispersions of paraffin wax are aqueous dispersions containing from about 20% solid wax to about 50% solid wax, and preferably from about 30% solid wax to about 40% solid wax. When relatively reactive fibrous materials are being coated with the diene rubber bonding latex of this invention, that is to say when the fibrous material is cotton, rayon or nylon, a single bonding latex composition may be employed. Where, however, the fibrous material being coated is a relatively nonreactive fibrous material such as, for instance, a glass and polyester and more specifically a polyalkylene terephthalate fibrous material, it is desirable to use multiple coatings of bonding latex. The aqueous dispersion of paraffin wax may be added to either or both of the multiple coating compositions employed in coating the nonreactive fiber. It is preferred, however, that the aqueous dispersion of paraffin wax be added to the final diene rubber latex coating deposited on the polyalkylene terephthalate fiber.

The fibrous materials, when in the form of continuous filament yarn, may be coated with the compositions employed herein by passing the yarn through a bath and squeezing to remove excess solution and to evenly distribute the latex compositions on the fibers. Other techniques known in the art for applying a solution to fibers can also be employed such as for instance, padding or spraying, or, in fact, any system which will provide a pickup of the diene rubber latex in the range of from about 0.5% to about 20% and preferably from about 2% to about 5% calculated on the weight of the starting fibers and on the latex solids. The thus coated fibers are then dried and cured at temperatures of from about 150° C. to about 250° C. and preferably from about 175° C. to about 230° C., the curing time being for a period of from about 30 seconds to about 10 minutes depending on the curing temperature employed.

In the event that the fibrous material being coated is a polyester such as a polyalkylene terephthalate fiber, a plural coating operation is employed. The coated and cured polyalkylene terephthalate fiber treated in the aforementioned manner is again coated with a modified latex solution and again dried and cured substantially in the manner previously set forth. Because the coated fibers do not, as a rule, pick up as much of the latex solution as the uncoated fibers, the squeezing to remove excess coating bath solution can advantageously be eliminated. Alternatively or additionally, the solids content of the second bath solution can be varied to achieve the desired solids pickup, all according to procedures known in the art. A pickup of from 0.5%–20%, preferably 1%–10%, and more preferably about 1.5%–5%, calculated on the weight of the starting fibers and on latex solids is usually employed, with a curing temperature of about 150°–250° C., preferably 175°–230° C. and more preferably about 200°–225° C.

Adhesion of the oxidation resistant latex coated fibers of this invention to rubber can be measured by the standard "H-pull" test, if the fibers are in yarn or cord form, or by the delaminating peel test when the fibers are in fabric form. In the "H-pull" test, a single cord is laminated into two spaced strips of rubber to form the letter H, with cord coated with a thin layer of rubber forming the bridge between the strips of cured rubber. Opposing pulling forces are then exerted on the strips of rubber to determine the force required to pull the cord from the rubber. In the delaminating peel test, the force required per inch of fabric to delaminate the rubber layer from the fabric layers is measured, e.g., on an Instron testing machine. In the process of this invention, if the selected yarn or cord has a breaking tensile strength less than about 33 pounds, which is common for cords used in belting and tires, perfect adhesion is often achieved, the cord will break before it is pulled from the cured rubber laminates.

The following comparative data is illustrative of the improvements obtained upon incorporation of paraffin wax into diene rubber latex bonding compositions. The values reported for the H-pull tests are expressed in pounds of force.

COMPARISON I

The following wax-free composition designated as Composition A–1 is formulated as follows:

|   | G. |
|---|---|
| Water | 1,696 |
| 70:15:15 butadiene-styrene-vinyl pyridine latex, 41% solids | 1,408 |
| Sodium hydroxide (50% aqueous solution) | 2.3 |
| Resorcinol | 62.7 |
| Formaldehyde (37% solution) | 93.6 |

One-half of the latex composition designated as Composition A was then taken and a 35% aqueous dispersion of paraffin wax (melting point 138°–143° F.) added thereto so as to produce a composition containing 3% by weight paraffin, which is designated as Composition B–1.

840/2 denier multi-filament plied nylon yarn was passed into a squeeze roll size box containing Composition A–1. Simultaneously, identical multi-filament plied nylon cord is passed into a squeeze roll size box containing Composition B–1. The wet pickup in both cases is adjusted to about 18.7% which accounts for a 3.3% solids pickup. The coated cords were then heated at oven temperatures at 230° C. for 96 seconds. The two coated cords were then prepared for H-pull tests at varying intervals with the results being as follows:

|   | Initial | 3 Days | 17 Days | 24 Days | 48 Days |
|---|---|---|---|---|---|
| Composition A–1 [1] | 27.5 | 22.8 | 16.8 | 7.4 | 7.2 |
| Composition B–1 [2] | 29.7 | 32.5 | 31.0 | 32.8 | 26.4 |

[1] Paraffin free.
[2] Paraffin containing.

COMPARISON II

The following compositions are prepared:

*Composition A–2*

|   | G. |
|---|---|
| 70:15:15 butadiene-styrene-vinyl pyridine latex, 41% solids | 125 |
| Diglycidyl ether of glycerine | 31.2 |
| Hydrocarbon sulfonate wetting agent | 1.25 |
| Water | 312 |

*Composition B–2*

|   | G. |
|---|---|
| 70:15:15 butadiene-styrene-vinyl pyridine latex, 41% solids | 144 |
| Resorcinol | 45 |
| Formaldehyde (37%) | 22 |
| Water | 219 |
| Isopropyl alcohol (as wetting agent) | 5.8 |
| Caustic 10% (to adjust resorcinol-formaldehyde resin to pH 9.0–9.3). | |

*Composition C–2*

One-half of the formulation prepared according to Composition B–2 was taken and sufficient quantities of a 35% aqueous dispersion of paraffin was added thereto to give a composition containing 3% wax based on the total weight of the composition, the composition being referred to hereafter as Composition C–2.

With Composition A–2 the diglycidyl ether of glycerine is dispersed in the mixture of the other ingredients. With Composition B–2, the resorcinol, formaldehyde and water are mixed for 15 minutes and then the butadiene-styrene-vinyl pyridine latex is added. The mix is aged for 96 hours before using. The isopropyl alcohol is then added to facilitate uniform wetting of the cord.

1100/2 polyethylene terephthalate multi-filament plied industrial cord is passed into a squeeze roll size box containing Composition A–2. Wet pickup is adjusted to about 18.7%, which gives a 3.3% solids pickup. The coated yarn is heated at constant length in an oven at 232° C. for 96 seconds. Equal portions of the resulting very tacky cord are then passed for 2 seconds into a dip pan containing 96 hour old Composition B–2 for one portion of Composition A–2 coated cord and into a dip pan containing 96 hour old Composition C–2 for another portion of Composition A–2 coated cord. The cords are then removed from the dip pans without squeezing to provide a wet pickup of about 8.5% which gives a 2.2% solids pickup. The coated cords are heated with very slight stretching in an oven at 232° C. for 120 seconds. Sections of the resulting cords were then prepared for "H-pull"

tests at regular intervals. The data from such "H-pull" tests being given as follows:

|  | Initial | 1 Day | 8 Days | 10 Days | 14 Days |
|---|---|---|---|---|---|
| Composition A-2 and B-2 [1] | 25.4 | 18.4 | 10.5 | 10.5 | 12.5 |
| Composition A-2 and C-2 [2] | 25.7 | 26.0 | 24.2 | 22.6 | 23.5 |

[1] Paraffin free.
[2] Paraffin containing.

COMPARISON III

The mixtures designated as Composition A-2 and Composition B-2 in Comparison II were again prepared.

A mixture designated as Composition C-3 was prepared as follows:

Composition C-3

| | G. |
|---|---|
| Water | 900 |
| Paraffin wax, melting point 138°–143° F. (35% aqueous dispersion) | 100 |

Compositions A-2 and B-2 are formulated substantially as outlined in Comparison II. 1100/2 polyethylene terephthalate multi-filament plied industrial cord is passed into a squeeze roll size box containing Composition A-2. Wet pickup is adjusted to about 18.7%, which gives a 3.3% solids pickup. The coated yarn is heated at constant length in an oven at 232° C. for 96 seconds. Equal portions of the resulting very tacky cord are then passed for 2 seconds into a dip pan containing 96 hour old Composition B-2. The cords are then removed from the dip pans without squeezing to provide a wet pickup of about 8.5% which gives a 2.2% solids pickup. One of the cords is then passed into a dip pan containing Composition C-3, in a manner sufficient to provide a wet pickup of 8%. The two cords are then heated with very slight stretching in an oven at 232° C. for 120 seconds. Sections of the resulting cords were then prepared for H-pull tests, the data from such H-pull tests being given as follows:

|  | Initial | 1 Day | 6 Days | 12 Days | 16 Days |
|---|---|---|---|---|---|
| Compositions A-2 and B-2 [1] | 25.4 | 17.6 | 12.8 | 12.8 | 12.8 |
| Compositions A-2 and B-2 and C-3 [2] | 25.7 | 24.3 | 21.2 | 22.6 | 22.8 |

[1] Paraffin free.
[2] Paraffin containing.

COMPARISON IV

The following compositions are prepared:

Composition A-4

| | G. |
|---|---|
| Water | 1,696 |
| 70:15:15 butadiene-styrene-vinylpyridine aqueous latex (41% solids) | 1,408 |
| Sodium hydroxide (50% aqueous solution) | 2.3 |
| Resorcinol | 62.7 |
| Formaldehyde (37% solution) | 93.6 |
| Thinner S (wetting agent containing amine condensate of coconut oil fatty acid marketed by Syn-Chem Corp.) | 22 |

One-half of the latex composition designated as Composition A-4 was then taken and a 35% aqueous dispersion of paraffin wax (melting point 138°–143° F.) added thereto so as to produce a composition containing 3% by weight paraffin which is designated as Composition B-4. A chafer fabric woven from 1040 denier rayon monofilament was passed into a squeeze roll size box containing Composition A-4. Simultaneously, identical rayon chafer fabric is passed into a squeeze roll size box containing Composition B-4. The wet pickup in both cases is adjusted to about 18.7% which accounts for a 3.3% solids pickup. The coated cords were then heated at oven temperatures of 230° C. for 96 seconds. The two coated fabrics were then stored in black polyethylene bags for a five week period.

At the end of this five week period, the samples were exposed to the atmosphere and subjected to daily "H-pull" tests. The data from such "H-pull" tests is given as follows:

|  | Initial | 1 Day | 2 Days | 3 Days |
|---|---|---|---|---|
| Composition A-4 [1] | 48 | 26 | 21 | 14 |
| Composition B-4 [2] | 70 | 55 | 68 | 84 |

[1] Paraffin free.
[2] Paraffin containing.

The improvement obtained in the latex oxidation resistance and corresponding improvement in rubber adhesion of aged latex coated yarn is quite unexpected especially where paraffin wax is coated on a yarn previously treated with a latex coating. It would be natural to expect paraffin to decrease the adhesion between rubber and latex coated yarn, but in actual practice the paraffin not only protects the latex coating from oxidation on ageing and the accompanying loss of adhesion to rubber, but also appears to increase the initial adhesion of the latex coated yarn for rubber. The paraffin waxes employed in the latex coating compositions of this invention are waxes which will provide a surface barrier between latex and those forces which cause oxidative breakdown, that is, ozone, oxygen and ultra-violet light. The surface barrier is obtained by the ability of the paraffin to bloom through the latex to the surface of the coating or alternatively, the paraffin wax may be applied as a superimposed coating on a previously deposited latex coating.

What is claimed is:

1. A fibrous material having a cured coating comprising a diene rubber latex and a paraffin wax having a melting point from about 90° F. to about 450° F., said coating comprising from about 0.5% to about 20% of said latex based on the weight of fibrous material and from about 0.1% to about 4.0% of wax based on the weight of said latex.

2. A fibrous material according to claim 1 which is selected from the group consisting of glass, cotton, rayon, nylon and polyester yarns.

3. A process for rendering a fibrous material bondable to rubber over an extended period of time, comprising coating said fibrous material with a diene rubber latex and subsequently superimposing a coating of an aqueous dispersion of a paraffin wax having a melting point of from 90° F. to about 450° F., drying and curing said fibrous material at a temperature from about 150° C. to about 250° C. for a period from about 30 seconds to about 10 minutes, said aqueous dispersion containing from 20 to about 50% by weight solid wax.

4. A process for rendering a fibrous material bondable to rubber over an extended period of time, comprising applying to said fibrous material a composition comprising a diene rubber latex and from 0.1 to about 4.0% by weight of the total composition of a paraffin wax having a melting point of from 90° F. to about 450° F. and drying and curing said fibrous material at temperatures of from about 150° C. to about 250° C. for a period of from about 30 seconds to about 10 minutes.

5. A process for rendering a fibrous material bondable to rubber over an extended period of time, comprising coating said material with a diene rubber latex and a paraffin wax having a melting point from about 90° F. to about 450° F., and curing the coated fibrous material at a temperature from about 150° C. to about 250° C. to form a coating comprising from about 0.5% to about 20% of said latex based on the weight of fibrous material and from about 0.1% to about 4.0% of wax based on the weight of said latex.

6. A process according to claim 5 in which said latex contains a butadiene-vinyl pyridine copolymer.

7. A process according to claim 5 in which said latex contains a modified butadiene-styrene-vinyl pyridine terpolymer.

8. A process according to claim 7 in which said terpolymer is composed of about 70% by weight butadiene, 15% by weight styrene and 15% by weight vinyl pyridine, and said paraffin wax has a melting point from about 125° F. to about 250° F.

References Cited

UNITED STATES PATENTS

| | | | |
|---|---|---|---|
| 1,904,576 | 4/1933 | Twiss et al. | 260—745 |
| 2,021,870 | 11/1935 | Reynolds | 117—80 |
| 2,062,178 | 11/1936 | Hiers | 260—745 X |
| 2,100,714 | 11/1937 | Hiers | 260—745 |
| 2,170,043 | 8/1939 | Worrall | 260—745 X |
| 2,238,165 | 4/1944 | Ellis et al. | 260—745 X |
| 2,410,792 | 11/1946 | Ten Broeck | 117—138.8 X |
| 2,514,979 | 7/1950 | Turner et al. | 117—161 X |
| 2,594,217 | 4/1952 | Rogers et al. | 260—745 X |
| 2,615,826 | 10/1952 | Mallory et al. | 117—161 |
| 2,652,353 | 9/1953 | Wilson | 117—80 |
| 2,817,616 | 12/1957 | Wolfe | 117—80 X |
| 2,948,696 | 8/1960 | Park | 117—161 X |
| 2,991,196 | 7/1961 | Biefeld | 117—161 X |
| 3,023,482 | 3/1962 | Gilboy et al. | 117—92 X |
| 3,079,665 | 3/1963 | Saylor | 117—161 |
| 3,201,362 | 8/1965 | Mark | 260—28.5 |

WILLIAM D. MARTIN, *Primary Examiner.*

R. HUSACK, *Assistant Examiner.*